(12) United States Patent
Krishnamurthy

(10) Patent No.: US 8,484,463 B1
(45) Date of Patent: Jul. 9, 2013

(54) SYSTEM AND METHOD FOR UTILIZING A RENDEZVOUS MECHANISM FOR SECURE INFORMATION EXCHANGE

(75) Inventor: Balachander Krishnamurthy, New York, NY (US)

(73) Assignee: AT & T Intellectual Property II, L.P., Atlanta, GA (US)

(*) Notice: Subject to any disclaimer, the term of this patent is extended or adjusted under 35 U.S.C. 154(b) by 1543 days.

(21) Appl. No.: 11/288,839

(22) Filed: Nov. 29, 2005

(51) Int. Cl.
*H04L 29/06* (2006.01)

(52) U.S. Cl.
USPC ............................ 713/163; 340/531; 713/182

(58) Field of Classification Search
USPC .................................. 340/531; 713/182, 163
See application file for complete search history.

(56) References Cited

U.S. PATENT DOCUMENTS

| | | | |
|---|---|---|---|
| 6,385,647 | B1 | 5/2002 | Willis et al. |
| 6,704,804 | B1 | 3/2004 | Wilson et al. |
| 6,789,126 | B1 | 9/2004 | Saulpaugh et al. |
| 6,792,466 | B1 | 9/2004 | Saulpaugh et al. |
| 6,868,447 | B1 | 3/2005 | Slaughter et al. |
| 6,898,618 | B1 | 5/2005 | Slaughter et al. |
| 7,026,925 | B2 * | 4/2006 | Roche et al. ................. 340/531 |
| 2006/0232792 | A1 * | 10/2006 | Kobayashi ................... 356/621 |
| 2006/0270419 | A1 * | 11/2006 | Crowley et al. ........... 455/456.2 |

* cited by examiner

*Primary Examiner* — Christopher Brown
(74) *Attorney, Agent, or Firm* — Fay Kaplun & Marcin, LLP.

(57) ABSTRACT

A system and method for receiving first information from a primary individual and establishing the primary individual as a first trusted user using the first information. Second information is then received from an interested subscriber, the second information including information relating the interested subscriber to the primary individual and establishing the interested subscriber as a second trusted user using the second information. A triggering event is received from the primary individual, where the triggering event includes third information verifying the primary individual as the first trusted user. An indication is provided to the interested subscriber based on the triggering event.

14 Claims, 5 Drawing Sheets

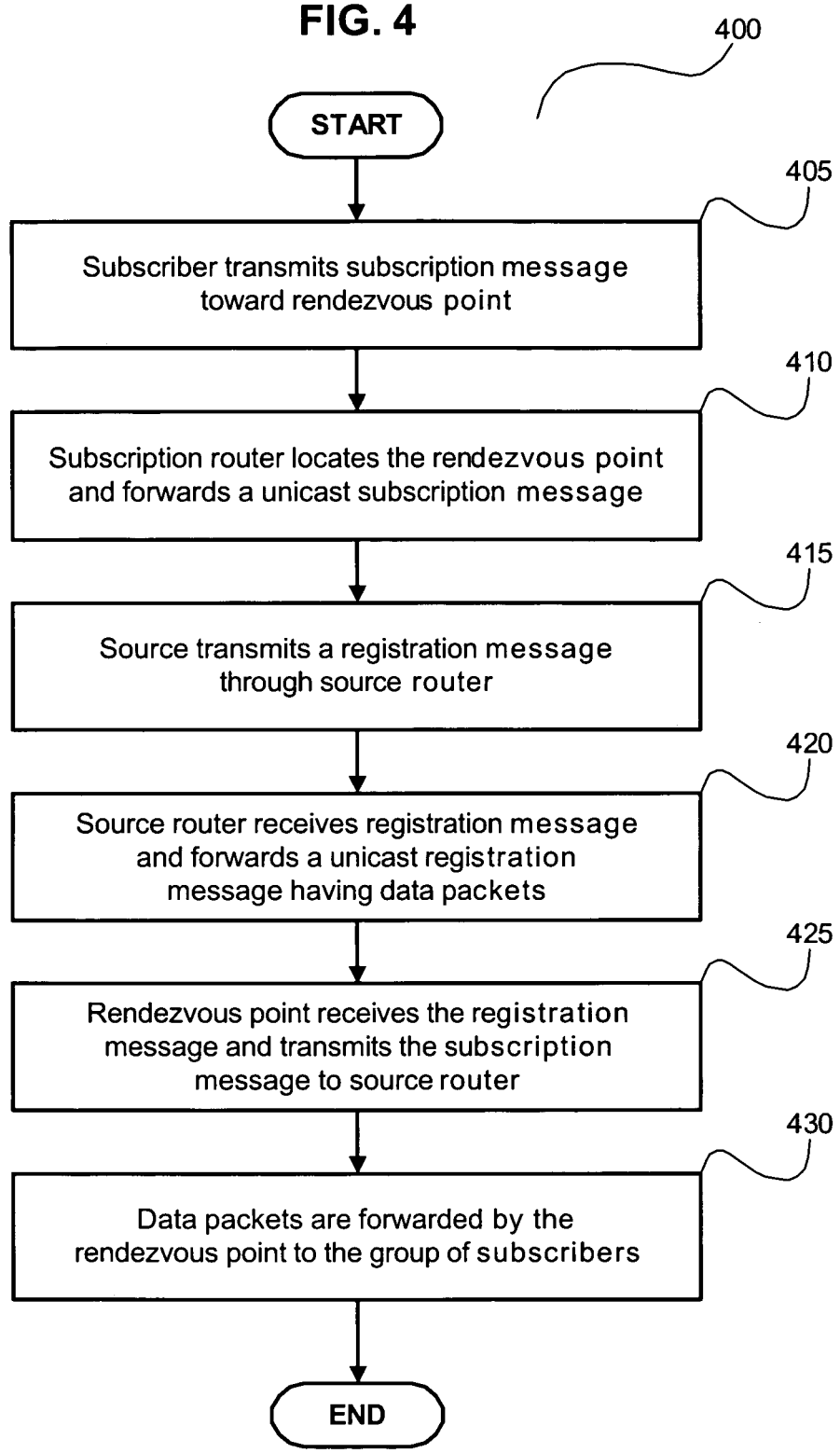

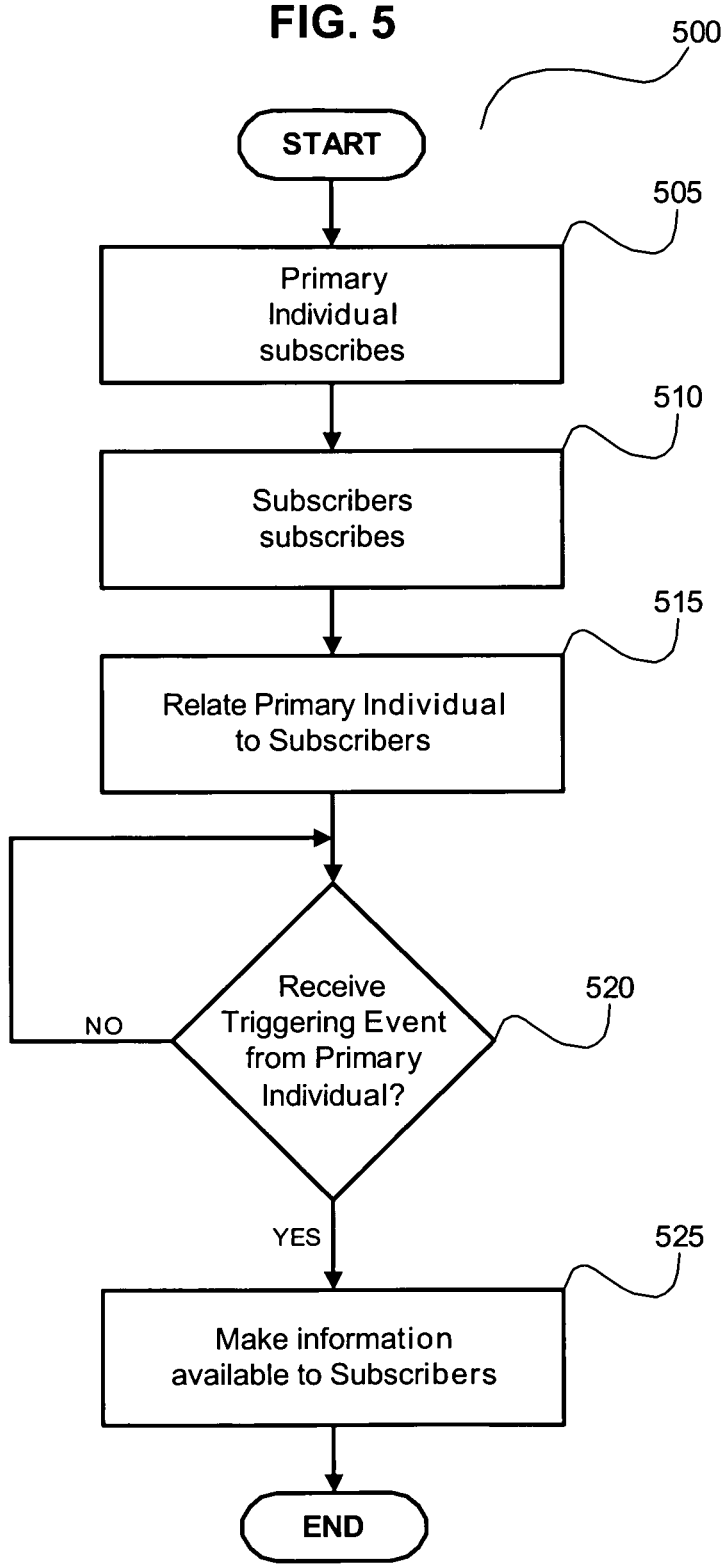

SYSTEM AND METHOD FOR UTILIZING A RENDEZVOUS MECHANISM FOR SECURE INFORMATION EXCHANGE

BACKGROUND

Currently, there are multiple websites available that provide for unsecured submission and inquiry within online databases containing personal information of individuals whose safety may be of immediate concern to relatives and other interested parties, e.g. in the event of a disaster, natural or otherwise. However, the current method does not ensure interested parties that the information that they receive is authentic, reliable, or up-to-date. Essentially, the current practice is to use these unsecured web-based posting sites as a means to attempt to communicate with persons of concern. The information exchange over these sites lacks any association between the recipient and the submitter of the personally identifiable information. The posted information in the database may be read or submitted by anyone with access to the Internet. There is no assurance that the information will not be accessed or altered by unauthorized individuals. Furthermore, without a single centralized database for the information, the search for an individual's safety status may involve several inquiries into different databases.

SUMMARY OF THE INVENTION

A method for receiving first information from a primary individual and establishing the primary individual as a first trusted user using the first information. Second information is then received from an interested subscriber, the second information including information relating the interested subscriber to the primary individual and establishing the interested subscriber as a second trusted user using the second information. A triggering event is received from the primary individual, where the triggering event includes third information verifying the primary individual as the first trusted user. An indication is provided to the interested subscriber based on the triggering event.

A system having a first receiving element for receiving a first information from a primary individual and a first verification element for establishing the primary individual as a first trusted user using the first information. The system further includes a second receiving element for receiving second information from an interested subscriber, the second information including information relating the interested subscriber to the primary individual and a second verification element for establishing the interested subscriber as a second trusted user using the second information. The system also includes a third receiving element for receiving a triggering event from the primary individual, where the triggering event includes third information verifying the primary individual as the first trusted user and an indication element for providing an indication to the interested subscriber based on the triggering event.

A computer readable storage medium including a set of instructions executable by a processor. The set of instructions being operable to receive first information from a primary individual, establish the primary individual as a first trusted user using the first information, receive second information from an interested subscriber, the second information including information relating the interested subscriber to the primary individual, establish the interested subscriber as a second trusted user using the second information, receive a triggering event from the primary individual, where the triggering event includes third information verifying the primary individual as the first trusted user and provide an indication the interested subscriber based on the triggering event.

BRIEF DESCRIPTION OF THE DRAWINGS

FIG. 4 shows an exemplary method for establishing an architecture using rendezvous-based communication according to the present invention.

FIG. 5 shows an exemplary method for providing interested subscribers with information pertaining to the status of the primary individual according to the present invention.

DETAILED DESCRIPTION

Figure 1:
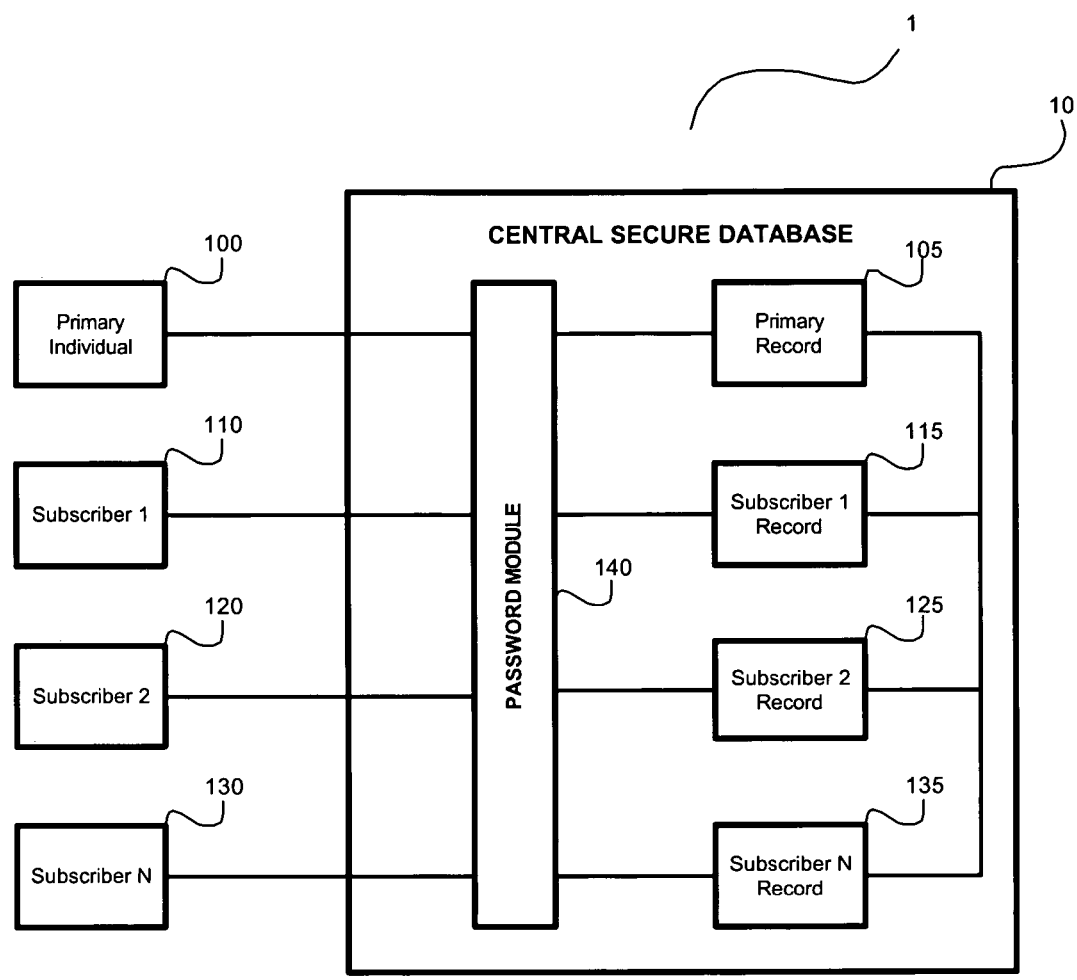
FIG. 1 shows an exemplary system including a central secure database according to the present invention.

The present invention may be further understood with reference to the following description and the appended drawings, wherein like elements are referred to with the same reference numerals. The present invention relates to the exchange of secured information between interested parties through a rendezvous mechanism, and in particular to a triggering mechanism for initiating the transmission of the secured information. The present invention may be particularly useful during periods of high tension where customary access to communication channels is limited, impractical, or impossible. A time of high tension may include such periods as the occurrence of a natural or man-made disaster. During these time periods, it is desirable to trigger a secure transmission of information pertaining to one's well-being to a select group of interested individuals. The exemplary embodiment of the present invention describes a method for utilizing a rendezvous mechanism for secure information exchange. The utilization of a rendezvous mechanism and the methods for triggering a transmission over a rendezvous-based communication will be discussed in detail below.

In the exemplary embodiments, the information within the secured exchange may be information pertaining to the safety status of an individual during a period of high tension. The information may be transmitted by a central secure database and may be received by one or more interested subscribers. Thus, during the occurrence of, for example, a natural disaster or an act of terrorism, the interested subscribers may be assured of the safety of a primary individual upon receiving a safety notification from the primary individual. To avoid having to search through multiple unsecured web-based posting sites, an exemplary embodiment of the present invention will include the central secure database for storing the personally identifiable information of the primary individual and of the interested subscribers.

Rendezvous mechanisms operate differently than traditional broadcast mechanisms. Instead of transmitting a data packet directly to a specific destination point, a rendezvous mechanism uses rendezvous-based communication. With this method of communication, an information source can associate each data packet with an identifier, which may be defined as a logical midpoint between the source and the recipient. The identifier may be used by one or more recipients (or interested subscribers) in order to obtain the data packets. This degree of indirect communication decouples the transmission action from the receiving action and allows for mobility of the source and the recipients.

The transmission action from a source to a recipient in a rendezvous mechanism may be performed on a subscription basis. The source may register at a midpoint destination, and the recipient may subscribe an interest in receiving communications from the source at that midpoint. This midpoint will perform the transmission action that may distribute to each of the subscribing recipients. The fact that a recipient's location, e.g. Internet Protocol ("IP") address, may be changing or that there are multiple addresses for multiple recipients will not have an effect on the source's ability to communicate with the recipient(s). Similarly, the fact that the source's location may be changing will also have no effect on the recipient's ability to communicate with the source. This mobility aspect enables both the source and recipient to communicate with each other while being unaware of the other's respective location. For example, a rendezvous mechanism may allow two hosts to communicate through a midpoint when the two hosts are each behind a network address translator without an address in the Internet's address space. Thus, this mechanism may be very beneficial within the technology of Internet infrastructure, specifically within multicasting systems. The term multicast should be understood to mean an addressing scheme where a number of IP addresses are designed to allow for point to multipoint distribution of data.

Traditional multicasting may be used to transmit data packets within a reception area where groups of subscribers are widely represented. However, when a group of subscribers and the information source are sparsely distributed across a wide area, traditional multicasting may not be efficient. Under this traditional method, the data packets from the information source may be transmitted to the subscribers over several links, and the subscription information from the subscribers may also be transmitted to the source periodically over several links. Due to the sparsely represented subscribers in the wide area, the transmission of this information may not lead to subscribers or information source in a timely manner, thereby decreasing the overall efficiency of the multicast transmission. Efficiency for multicast mechanisms may be evaluated in terms of state, control message processing, and data packet processing required across the entire network in order to distribute the data packets to the subscribing group members.

According to the exemplary embodiments of the present invention, a rendezvous-based communication may be used during a critical period to allow a primary individual to selectively and securely share information with a selective set of interested subscribers. Unlike the standard broadcasting of data, an exemplary rendezvous-based multicasting system may use explicit subscription (or joining) by the groups of subscribers to a designated rendezvous point in order for each group member to receive the data transmitted from an information source.

A rendezvous mechanism of the present invention may be described as a rendezvous-based multicast routing protocol. A rendezvous-based protocol associates each multicast group address with a physical unicast address, i.e. single destination addressing. The destination of this unicast address is referred to as a rendezvous point. In order to receive data packets from the source, the group members may subscribe to a multicast distribution tree rooted at the rendezvous point. This multicast distribution tree will receive information from the rendezvous protocol indicating which routers are directed to group members. Thus, the rendezvous-based protocol will be able to transmit data exclusively to group members through the routers on the multicast distribution tree.

Examples of rendezvous-based multicasting include Core Based Trees ("CBTs") and Protocol Independent Multicast-Spare Mode ("PIM-SM"). A CBT architecture uses a distribution tree having a single "core" router to multicast data packets to a particular group. In a PIM-SM architecture, the routers must specifically indicate their willingness to receive (or subscribe to) multicast messages or multicast groups. PIM-SM may be referred to as a multicasting routing architecture capable of efficiently establishing the distribution trees of the CBT architecture throughout the Internet. Thus, an exemplary rendezvous mechanism may establish distribution trees across wide-area networks, where many groups are sparsely represented. These flexibility and scaling properties of the PIM-SM architecture are advantageous in multicast communications.

In an exemplary embodiment of the present invention, the rendezvous-based multicasting mechanism is PIM-SM. The architecture of PIM-SM maintains the traditional IP multicast service model of recipient-initiated membership and builds a shared multicast distribution tree centered at the rendezvous point. The PIM-SIM then builds source-specific trees for an information source and uses the subscriptions (or joins) generated from subscriber routers toward the multicast distribution tree. As stated above, the PIM-SM architecture is not dependent on a specific unicast routing protocol and will uses soft-state mechanisms to adapt to underlying network conditions and subscription group dynamics.

In an exemplary embodiment of the present invention, a person (or interested subscriber) interested in the safety status of an individual of concern may subscribe to a central secure database by providing personally identifiable information pertaining to the individual. In addition, the person of concern (or primary individual) may register with the central secure database by providing personally identifiable information pertaining to that person. Through the use of a triggering mechanism, the primary individual may trigger a transmission (or multicast) of a safety notification to the interested subscriber(s). It should be noted that there may be one or more interested subscribers to a primary individual. Furthermore, the primary individual may also be an interested subscriber for another primary individual, e.g. each member of a family may be a primary individual and a subscriber for every other family member.

Those of skill in the art will understand that the use of an Internet-based rendezvous mechanism is only exemplary and the present invention may be applied to any type of rendezvous mechanisms. Other examples of rendezvous mechanisms include a peer-to-peer mechanism, wherein the information is entered into a network and then accessible to the interested parties. A further example of rendezvous mechanisms includes a peer-to-peer rendezvous-based service integrated with an event-based publish/subscribe service.

The action that causes the source to initiate the transmission of the group-specific data is referred to as a triggering mechanism, where the source is the central secure database. A primary individual may activate this trigger mechanism, thereby transmitting information over a multicast from the central source database to an interested subscriber or groups of interested subscribers. Thus, the relevant groups of interested parties are able to receive any information pertaining to the safety status of the primary individual. Given the likelihood of limited access to standard communications during a period of high tension, the triggering mechanism may be a simple action. The simple action may be performed with a few short steps such as registering on a website or dialing a pre-set telephone number. Therefore, in the event of an emergency, a primary individual may be able to perform a quick and simple action to trigger a secure transmission of a safety notification to several interested people all at once.

Due to the current state of identity theft over the Internet, people are reluctant to disclose any personal information over the Internet without a secured transmission. It is important that a central database be secure in order to encourage individuals to provide personally identifiable information. In addition, a central secure database with strong fidelity may allow for the secure transmission of a safety notification from a primary individual to one or more interested subscribers during a crisis.

To ensure strong security, an exemplary embodiment of the present invention will include storing the information in an encrypted central secure database. The central secure database may include personally identifiable information as to allow any interested subscribers to be certain of the validity of the source of the transmission. Encryption refers to algorithmic schemes that encode plain text into non-readable form or ciphertext, providing privacy. While strong encryption may make the data private, it is not necessarily secure. To be secure, the recipient of the data, the subscriber, must be positively identified as being an approved party. The approval process can be accomplished through the use of personal authentication modules.

The central secure database of an exemplary embodiment of the present invention may have personal authentication by way of a password module, which may include elements such as digital signatures, digital certificates, and challenge-response authentication. The interested subscribers and the primary individual may have distinct passwords in order to uniquely identify themselves and update any personally identifiable information within the central secure database. In addition, the updated information may also be transmitted to any interested subscribers in a transmission subsequent to the initial transmission. Therefore, the use of multiple transmissions will allow the interested subscribers to receive continual updates concerning the safety status of the primary individual.

To ensure fidelity, the transmitted information may be encoded with publicly certifiable and verifiable information that may validate whether the time the information was registered with the database was during the critical period. This verifiable information may be in the form of a time-stamp created by the central secure database. The central secure database may stamp the time and date of a primary individual's activation of a triggering mechanism. This time-stamp may be included within the safety notification transmitted to the interested subscribers as to allow the interested subscribers to verify the instance of the primary individual's transmission. Furthermore, the transmission may also be encoded with a tag that certifies the identity of the individual. Thus, when the central secure database transmits the safety notification and registered information of the primary individual, the interested subscribers may be assured of the fidelity of the information.

In addition, an exemplary embodiment of the present invention may also include a back channel. A back channel may be defined as a communication channel from the interested subscriber back to the primary individual. Utilizing a back channel, the personally identifiable information of the interested subscribers would be available within the same rendezvous mechanism. Therefore, the primary individual may ascertain that all interested subscribers have obtained the necessary information, and thus the primary individual may be assured that the transmission of the safety notification was properly received.

In another embodiment of the present invention, the information may be automatically transmitted to the interested subscribers. As opposed to waiting for the information to be retrieved within the central secure database, the interested subscribers would be able to receive a safety notification from the primary individual by way of an automatic dispatch. This dispatch may be in the form of an electronic message alert or a telephonic alert. Furthermore, these alerts may also be automated alerts generated by the central secure database.

FIG. 1 shows an exemplary system 1 including a central secure database 10 that may be used to implement the exemplary embodiment of the present invention. Throughout this description, the term central secure database has been used and will be used to describe certain exemplary functionality implemented in accordance with the exemplary embodiments of the present invention. Those of skill in the art will understand that beyond a central secure database, the database may be distributed. It will further be understood that the described functionality does not need to be implemented via a database structure. The described functionality may be implemented via any software and/or hardware or combination thereof.

In the exemplary embodiment of FIG. 1, there are four individuals interacting with the central secure database 10, namely primary individual 100 and subscribers 110-130. The primary individual 100 is the person about whom other individuals desire to know, e.g., is the primary individual 100 alright. The subscribers 110-130 may be people who are interested in any information pertaining to the well being of the primary individual 100. Examples of subscribers 110-130 may include family members, friends, loved-ones, etc.

These persons 100-140 may communicate with the central secure database 10. For example, the primary individual 100 may subscribe to a service provided by the central secure database 10, e.g. notify your family and friends that you are safe during an emergency. The initial subscription may require the primary individual 100 to provide personal or other types of information that is stored in the central secure database 10, e.g. in primary record 105. This information may be used at a later time to notify the subscribers 110-130 interested in the condition of the primary individual 100. In one exemplary embodiment, the primary individual 100 may initially subscribe via a website offering access to the central secure database 10. However, those skilled in the art will understand that there may be numerous manners of initially subscribing to the service.

The subscribers 110-130 may also subscribe to the service provided by the central secure database 10. In the same manner as described above, the subscribers 110-130 may provide personal or other types of information that is stored in the central secure database 10, e.g. in subscriber records 115-135. In one embodiment, when the primary individual 100 subscribes to the service, the primary individual 100 may provide contact information (e.g. email address) for potential subscribers and the central secure database 10 may send invitations to the potential subscribers (e.g. via email). In another embodiment, the primary individual 100 may inform the potential subscribers of the service so that the potential subscribers may subscribe. In any case, when the primary individual 100 and the subscribers 110-130 are subscribed to the service, the central secure database 10 includes corresponding records 105 (primary individual 100), 115 (subscriber 1 110), 125 (subscriber 2 120), and 135 (subscriber 3 130).

As shown in FIG. 1, the records 105-135 may relate to each other in order that information is disseminated to the proper people. For example, when subscribing to the service, subscriber 1 110 may provide information to the central secure database 10 that subscriber 1 110 is interested in receiving information about the primary individual 100. Thus, this information may be stored in subscriber 1 record 115 or primary record 105 to relate subscriber 1 110 to the primary individual 100.

In addition, the central secure database 10 may include a password module 140 for both the primary individual 100 and the subscribers 110-130 to ensure fidelity of their personal information. The password module 140 may provide secure access to the personal or other types of information to ensure that the information is accurate and authentic. Thus, the records 105-135 in the central secure database 10 may be added to, edited, updated, and removed by an individual once access is granted by the password module 140.

In the event of an emergency, the primary individual 100 may desire to inform the interested subscribers (e.g. subscribers 110-130) as to the condition of the primary individual 100. The primary individual 100 may initiate this by providing the central secure database 10 with a triggering event. The triggering event may be, for example, the primary individual 100 logging into a website and providing information that identifies the primary individual 100. This act of providing information to identify the primary individual 100 will assure the subscribers that the information they are receiving is accurate and authentic. Other triggering events may include, for example, a telephone call to a predetermined number, and electronic mail to a predetermined email address, etc.

In one embodiment, the triggering event may include particular status information, e.g. the primary individual 100 may be allowed to place a specific or personal message in the information that is provided to subscribers. In another embodiment, the primary individual 100 may be allowed to select from a preset list of status messages, e.g. "I'm O.K.," "I am still in danger," "Need help immediately," "Will update you in 1 day," etc. In still another embodiment, the triggering event does not allow for any type of message and the subscribers are merely provided with an indication that the primary individual initiated a triggering event.

The central secure database 10 may store the triggering event in the primary record 105 corresponding to the primary individual 100 and then inform the interested subscribers of the triggering event to indicate the safety of the primary individual 100. As described above and as will be described in greater detail below, this information may be pushed to the subscribers using a rendezvous mechanism. However, it is also possible that the record of the triggering event may be stored in the central secure database 10 for access by the subscribers at a time determined by the subscribers. As described above, the central secure database 10 will associate or relate the primary record 105 with the interested subscribers so that the message is sent to these interested subscribers, or that these interested subscribers are provided with access to the status information for the primary individual 100 stored in the central secure database 10.

In any event, once the central secure database 10 receives the triggering event, the central secure database 10 records the event including a time stamp of the event. The purpose of the time stamp is to provide the subscribers with the time of the triggering event, thereby providing the subscribers with an accurate indication of when the primary individual 100 triggered the event.

Figure 2:
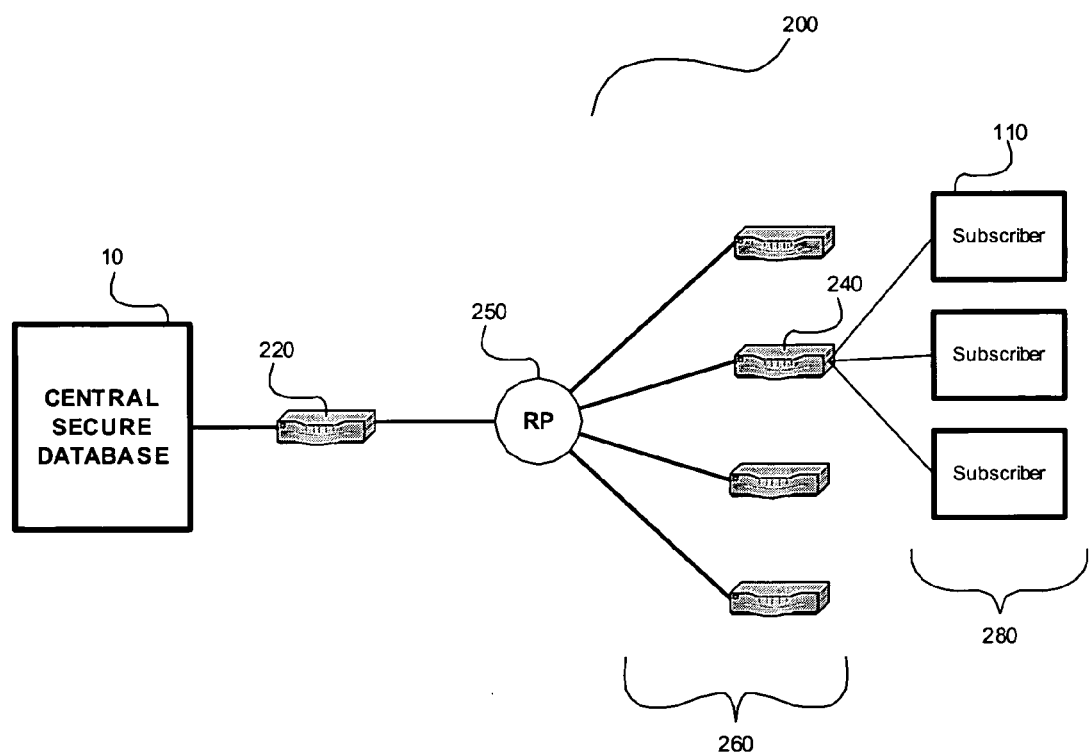
FIG. 2 shows an exemplary rendezvous mechanism according to the present invention.

FIG. 2 shows an example of a rendezvous mechanism 200, i.e., where the status of the primary individual 100 is multicast to the interested subscribers. The exemplary mechanism 200 is a rendezvous-based multicast routing protocol comprised of a central secure database 10, a source router 220, an interested subscriber 110, a subscribing router 240, and a rendezvous point 250. The interested subscriber 110 may be a member of a subscribing group 280, e.g. all the subscribers interested in the status of the primary individual 100. The mechanism 200 uses explicit subscription (or joining) messages to the designated rendezvous point 250. Under this architecture, any new subscribers would receive data from the central secure database 10 and any new updates to the central secure database 10 will transmit to all existing group subscribers.

The mechanism 200 may distribute group-specific data and subscription information only to those routes that are on a multicast distribution tree 260. The group-specific data may include information from the primary record 105 corresponding to the primary individual 100, e.g. a status message after a triggering event. As described above, the subscription information may include personal or other types of information of the interested subscriber 110 stored in record 115.

The interested subscriber 110 first joins a multicast tree 260 routed at a rendezvous point 250 in order to receive data transmitted to the subscribing group 280. When a subscribing router 240 discovers it has interested subscriber 110, the subscribing router 240 initiates the transmission of periodic subscribing (or joining) messages towards the designated rendezvous point 250. The messages may include, for example, the data source address, the multicast subscribing group address, the incoming interface from which the packets are accepted, the list of outgoing interfaces to which packets are sent, etc.

When the central secure database 10 transmits to the subscribing group 280, the source router 220 transmits a unicast containing register-messages to the rendezvous point 250 with the data packets of the central secure database 10 within the unicast. Once the data packets reach the rendezvous point 250, the data is forwarded along the multicast distribution tree 260 toward the interested subscriber 110. Thus, the above shows an exemplary embodiment where the central secure database 10 pushes information to the interested subscribers. It should be noted that the subscribers may change location and, as long as the central secure database 10 is made aware of the location through subscription information, the central secure database 10 can push any relevant information to the new location.

Figure 3:
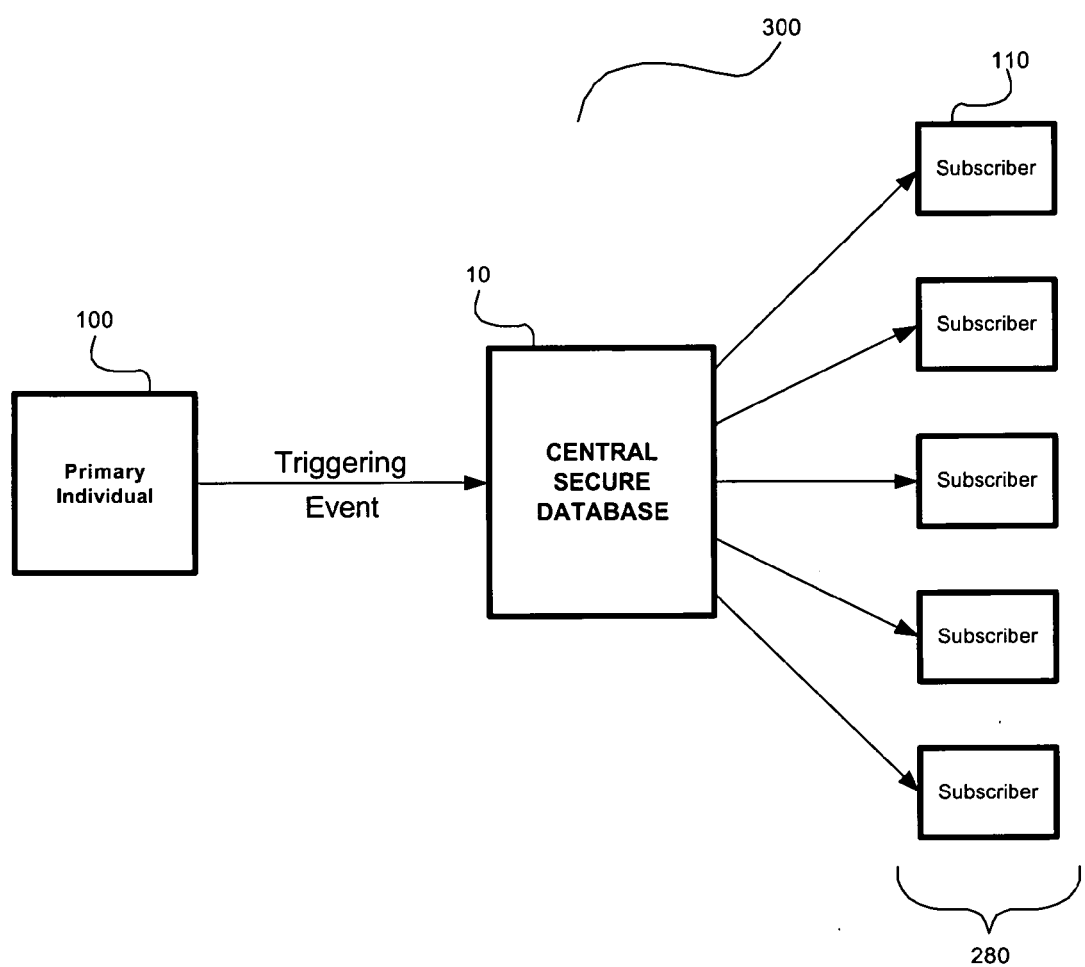
FIG. 3 shows an exemplary multicast over a rendezvous mechanism according to the present invention.

FIG. 3 shows a multicast system 300 over a rendezvous mechanism in an exemplary embodiment of the present invention. This multicast system 300 allows for selective and secure sharing of information to a selective set of interested parties during a critical period. During a critical period, it may be difficult, infeasible, or impossible for a primary individual 100 to communicate with the set of interested parties. This set of interested parties may belong to a subscribing group 280.

This exemplary multicast system 300 may allow an interested subscriber 110 to learn authenticated, identifiable, and up-to-date information from a trusted source regarding the safety of person of concern, e.g. primary individual 100. Through an exemplary rendezvous mechanism 300, the primary individual 100 may trigger the transmission of a safety notification to a subscribing group 280 during a time of high tension. As described above, this trigger may be initiated by a triggering event initiated by the primary individual 100 to the central secure database 10. Upon receiving this signal, the central secure database 1 will transmit the multicast of the primary individual's safety notification to all interested subscriber in the subscribing group 280.

FIG. 4 shows an exemplary method 400 for establishing an architecture using rendezvous-based communication. This method includes an information source, a source router, a group of interested subscribers, subscriber routers, and a protocol router acting as a rendezvous points. In addition, each group of interested subscribers has a group router as the rendezvous point for that group at any given time.

In order to establish a rendezvous-based subscription between a subscriber and an information source, in step 405 the subscriber transmits a subscription message towards the rendezvous point of the group, setting up a path from the rendezvous point back to the subscriber. In step 410, the subscription routers for each of the subscribers locate the rendezvous-point and forward a unicast subscription message to the rendezvous-point. Thus, a communication link is created between the subscriber and the information source.

To accomplish the information exchange from the information source to the group of subscribers, in step 415 the information source (e.g. central secure database) transmits a registration message through the source router. In step 420, the source router receives the registration message and unicasts it to the rendezvous point of the group with the data packets encapsulated within. In step 425 the rendezvous point receives the registration message and transmits the subscription message back to the source router. Lastly, in step 430 the data packets reaching the rendezvous point are forwarded to the group of interested subscribers along a multicast distribution tree.

FIG. 5 shows an exemplary method 500 for providing interested subscribers with information pertaining to the status of the primary individual 100. As described above, during an emergency the primary individual 100 may desire to initiate a triggering event that may inform a group of interested subscribers of his current condition. In step 505, the primary individual 100 may subscribe to a central location. This central location may be secure database with strong fidelity capable of multicasting a transmission that includes information regarding the status of the primary individual 100. The subscription of the primary individual 100 may include personal information regarding the primary individual 100 and may establish an initial connection between the primary individual 100 and the central location.

In step 510, any interested subscribers may subscribe to the central location. The subscription of the interested subscribers may include personal information regarding the subscribers and may establish an initial connection between the interested subscribers and the central location. Upon connecting each of the individuals to the central location, the central location may relate the primary individual 100 to the interested subscribers in step 515. The relation between these individuals may allow for communication between the primary individual 100 and the interested subscribers by way of the central location.

The communication between the primary individual and the interested subscribers may be initiated by a triggering event. In step 520 of the exemplary method of the present invention, the central location may verify whether a triggering event has been received from the primary individual 100. As described above, the primary individual 100 may initiate the triggering event through interacting with the central location. The interacting may be accomplished via a predetermined website, a predetermined telephone number, etc. Once the central location receives the triggering event, in step 525 the central location may make the information regarding the status of the primary individual 100 available to the interested subscribers. Thus, in the event of an emergency, the primary individual 100 may use the exemplary embodiment of the present invention to trigger a notification to a group of interested subscribers as to the safety status or condition of the primary individual 100.

It will be apparent to those skilled in the art that various modifications may be made in the present invention, without departing from the spirit or scope of the invention. Thus, it is intended that the present invention cover modifications and variations of this invention provided they come within the scope of the appended claims and their equivalents.

What is claimed is:

1. A non-transitory computer readable storage medium storing a set of instructions executable by a processor, the set of instructions, when executed by the processor, causing the processor to perform operations comprising:

receiving, at a rendezvous point, a registration message including first information from a primary individual, the rendezvous point being a location remote from the primary individual receiving subscriptions requests for a multicast group and distributing messages to the multicast group;

establishing the primary individual as a first trusted user using the first information;

receiving, at the rendezvous point via a subscription router, a subscribing message including second information from an interested subscriber to the primary individual;

establishing the interested subscriber as a second trusted user authorized to receive private information relating to the first trusted user using the second information;

receiving, via a source router, a triggering event including a plurality of data packets from the primary individual, the plurality of data packets including the private information relating to the first trusted user, where the triggering event includes third information verifying the primary individual as the first trusted user;

multicasting the data packets from the rendezvous point to the interested subscriber based on the triggering event; and wherein the first information, The second information, and the triggering event are received by an encrypted secure database.

2. The non-transitory computer readable storage medium of claim 1, wherein the operations further comprise:

forwarding the subscribing message from the rendezvous point to the source.

3. The non-transitory computer readable storage medium of claim 1, wherein the operations further comprise:

updating the first information from the primary individual;

providing an indication based on the triggering event to the interested subscriber further based on the updated first information.

4. The non-transitory computer readable storage medium of claim 1, wherein the interested subscriber is a one or more interested subscribers.

5. The non-transitory computer readable storage medium of claim 1, wherein the indication includes a time-stamp.

6. The non-transitory computer readable storage medium of claim 2, wherein the rendezvous mechanism includes a multicast routing protocol.

7. The non-transitory computer readable storage medium of claim 6, wherein the multicast routing protocol is one of a Protocol-Independent Multicast Sparse Mode architecture and a Core-Based Trees architecture.

8. A system, comprising:

a hardware computer processor;

a first receiving element for receiving, at a rendezvous point, a registration message sent from a source router and including first information from a primary individual, the rendezvous point being a location remote from the primary individual receiving subscription requests for a multicast group and distributing messages to the multicast group;

a first verification element for establishing the primary individual as a first trusted user using the first information;

a second receiving element for receiving, at the rendezvous point, a subscribing message sent from a subscription router and including second information from an interested subscriber, the second information including information relating the interested subscriber to the primary individual;

a second verification element for establishing the interested subscriber as a second trusted user authorized to receive private information relating to the first trusted user using the second information;

a third receiving element for receiving, at the rendezvous point, a triggering event from the primary individual, where the triggering event includes a plurality of data packets the plurality of data packets including the private information relating to the first trusted user, and third information verifying the primary individual as the first trusted user;

an indication element for providing, from the rendezvous point, an indication to the interested subscriber based on the triggering event, the indication including the plurality of data packets; and wherein the first information, the second information, and the triggering event are received by an encrypted secure database.

9. The system of claim 8, wherein the subscription message is forwarded from the rendezvous point to the source.

10. The system of claim 8, further comprising:

an updated subscription information based on a further information from the primary individual, wherein the indication based on the triggering event is provided to the interested subscriber further based on the updated first information.

11. The system of claim 8, wherein the interested subscriber is one or more interested subscribers.

12. The system of claim 8, wherein the indication includes a time-stamp.

13. The system of claim 9, wherein the rendezvous mechanism includes a multicast routing protocol.

14. The system of claim 13, wherein the multicast routing protocol is one of a Protocol-Independent Multicast Sparse Mode architecture and a Core-Based Trees architecture.

* * * * *